United States Patent
Mauri et al.

(10) Patent No.: US 8,630,068 B1
(45) Date of Patent: Jan. 14, 2014

(54) METHOD AND SYSTEM FOR PROVIDING A SIDE SHIELDED READ TRANSDUCER

(75) Inventors: Daniele Mauri, San Jose, CA (US); Chih-Ching Hu, Pleasanton, CA (US); Ming Mao, Dublin, CA (US); Kuok San Ho, Emerald Hills, CA (US); Savas Gider, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 8 days.

(21) Appl. No.: 13/296,970

(22) Filed: Nov. 15, 2011

(51) Int. Cl.
 *G11B 5/39* (2006.01)

(52) U.S. Cl.
 USPC .......................................................... 360/319

(58) Field of Classification Search
 USPC .......................................................... 360/319
 See application file for complete search history.

(56) References Cited

U.S. PATENT DOCUMENTS

| | | | |
|---|---|---|---|
| 5,838,521 A | 11/1998 | Ravipati | |
| 6,358,635 B1 | 3/2002 | Min et al. | |
| 6,496,335 B2 | 12/2002 | Gill | |
| 6,980,403 B2 | 12/2005 | Hasegawa | |
| 7,046,487 B2 | 5/2006 | Terunuma | |
| 7,158,351 B2 | 1/2007 | Nakamoto et al. | |
| 7,180,712 B1 | 2/2007 | Li et al. | |
| 7,573,683 B1 * | 8/2009 | Benakli et al. | 360/319 |
| 7,599,151 B2 * | 10/2009 | Hatatani et al. | 360/319 |
| 7,599,154 B2 | 10/2009 | Sbiaa et al. | |
| 7,872,835 B2 * | 1/2011 | Guan | 360/319 |
| 7,876,534 B2 * | 1/2011 | Chou et al. | 360/319 |
| 7,974,048 B2 * | 7/2011 | Shimazawa et al. | 360/319 |
| 8,089,734 B2 * | 1/2012 | Miyauchi et al. | 360/319 |
| 8,094,419 B2 * | 1/2012 | Guan | 360/319 |
| 8,179,642 B2 * | 5/2012 | Kawamori et al. | 360/319 |
| 2006/0109592 A1 | 5/2006 | Watanabe et al. | |
| 2008/0013221 A1 | 1/2008 | Ohta et al. | |
| 2009/0279213 A1 | 11/2009 | Wu et al. | |
| 2010/0079917 A1 | 4/2010 | Miyauchi et al. | |
| 2011/0317313 A1 * | 12/2011 | Miyauchi et al. | 360/245.3 |

OTHER PUBLICATIONS

C. Haginoya, M. Hatatani, K. Meguro, C. Ishikawa, N. Yoshida, K. Kusukawa, and K. Watanabe; Side-Shielded Tunneling Magnetoresistive Read Head for High-density Recording, IEEE Transactions on Magnetics, vol. 40, No. 4, Jul. 2004, pp. 2221-2223, IEEE.

* cited by examiner

*Primary Examiner* — Mark Blouin

(57) ABSTRACT

A method and system for providing a magnetic transducer having an air-bearing surface (ABS) is described. The magnetic read transducer includes a first shield, a magnetoresistive sensor, at least one soft magnetic side shield, and a second shield. The magnetoresistive sensor includes a sensor layer having at least one edge in the track width direction along the ABS. The at least one soft magnetic side shield is adjacent to the at least one edge of the sensor layer. The at least one soft magnetic side shield has a full film permeability of at least ten. The magnetoresistive sensor is between the first shield and the second shield and free of an in-stack hard bias layer.

31 Claims, 6 Drawing Sheets

US 8,630,068 B1

METHOD AND SYSTEM FOR PROVIDING A SIDE SHIELDED READ TRANSDUCER

BACKGROUND

FIG. 1 depicts an air-bearing surface (ABS) view of a conventional read transducer used in magnetic recording technology applications. The conventional read transducer 10 includes shields 12 and 18, insulator 14, hard bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. Consequently, as used herein a sensor layer 28 is typically a free layer.

If the sensor 20 is to be used in a current perpendicular to plane (CPP) configuration, the insulator 14 is used. Thus, current is driven in a direction substantially perpendicular to the plane of the layers 22, 24, 26, and 28. Conversely, in a current parallel to plane (CIP) configuration, then conductive leads (not shown) would be provided on the hard bias structures 16.

The hard bias structures 16 are used to magnetically bias the sensor layer 28. In an ideal case, the hard bias structures 16 match the thickness, moment, and location of the sensor layer 12. The hard bias structures 16 typically include hard magnetic materials having a low permeability. The hard bias structures generally have a magnetization fixed in the working ranges of the transducer. The hard bias structures 16 typically magnetically bias the magnetization of the sensor layer 28 in the track width direction.

Although the conventional transducer 10 functions, there are drawbacks. The conventional transducer 10 has a shield-to-shield spacing of SS and a physical width of the sensor layer 28 of w. In general, the shield-to-shield spacing is desired to be reduced as higher density memories are to be read. Similarly, the track width is generally decreased as reading of higher density memories and thus higher cross-track resolution are desired. The cross-track resolution of the sensor layer 28 is primarily determined by the physical width, w, of the sensor layer 28. However, magnetic flux entering from the sides of the sensor layer 28 can adversely impact cross-track resolution. Stated differently, magnetic flux entering from the sides of the sensor layer 28 may influence the ability of the sensor layer 28 to accurately read data. The shields 12 and 18 may prevent some flux from reaching the sides of the sensor layer 28. However, as technologies scale to higher recording densities, the shield-to-shield spacing does not decrease sufficiently to address this issue. In addition, other recording mechanisms, such as shingle recording, may require improved cross-track resolution.

A conventional method for improving the cross-track resolution of the conventional transducer 10 is to introduce an in-stack hard bias layer in connection with side shields. An in-stack hard bias layer is one which resides between (on a line parallel to the down track direction) the sensor layer 28 and the shield 12 or directly between the sensor layer 28 and the shield 18. Generally, the in-stack hard bias would reside directly above (in the down track direction/toward shield 18) the sensor layer 28. The in-stack hard bias layer is desired to maintain the magnetic biasing of the sensor layer 28 in the track direction. Thus, the in-stack hard bias layer may replace the hard bias structures 16. However, such an in-stack hard bias layer would increase the shield-to-shield spacing, SS, of the transducer 10. Such an increase is undesirable.

Accordingly, what is needed is a system and method for improving the cross-track resolution of a magnetic recording read transducer.

BRIEF SUMMARY OF THE INVENTION

A method and system for providing a magnetic transducer having an air-bearing surface (ABS) is described. The magnetic read transducer includes a first shield, a magnetoresistive sensor, at least one soft magnetic side shield, and a second shield. The magnetoresistive sensor includes a sensor layer having at least one edge in the track width direction along the ABS. The soft magnetic side shield(s) are adjacent to the edge(s) of the sensor layer. The soft magnetic side shield(s) has a full film permeability of at least ten. The magnetoresistive sensor is between the first shield and the second shield and free of an in-stack hard bias layer.

DETAILED DESCRIPTION OF THE PREFERRED EMBODIMENTS

Figure 1:
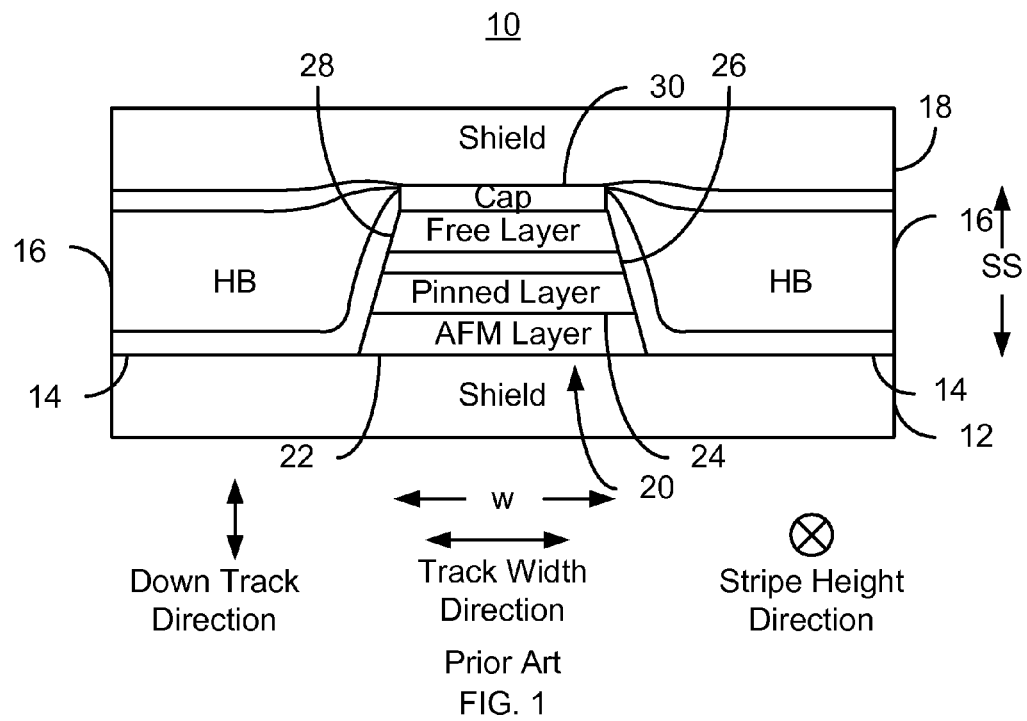
FIG. 1 depicts an ABS view of a conventional magnetic recording read transducer.
Figure 2:
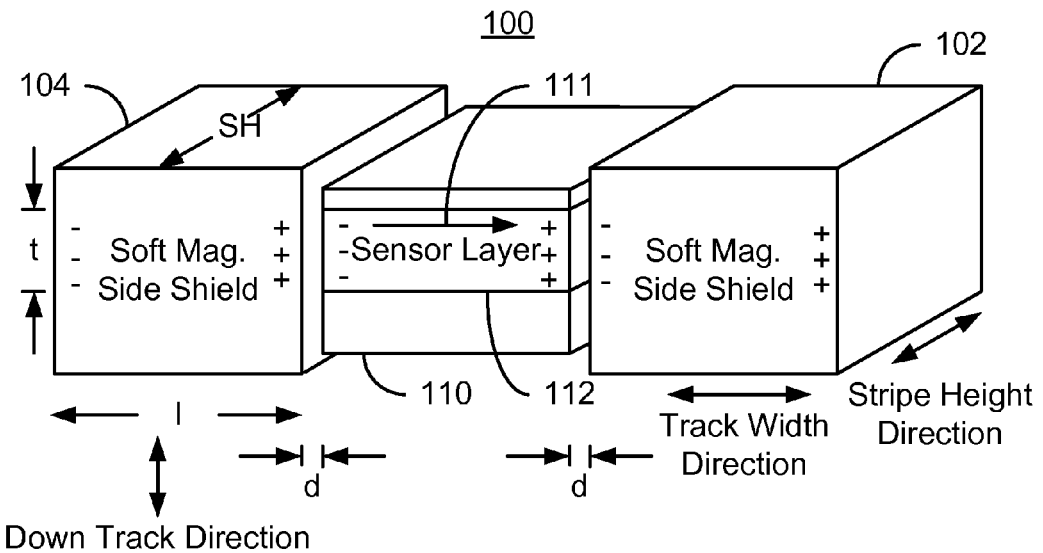
FIG. 2 depicts a perspective view of an exemplary embodiment of a portion of a magnetic recording read transducer.

FIG. 2 depicts a perspective view of an exemplary embodiment of a portion of a magnetic read transducer 100. For clarity, FIG. 2 is not to scale. The read transducer 100 may be part of a read head or may be part of a merged head that also includes a write transducer. The head of which the read transducer 100 is a part is part of a disk drive having a media, a slider and the head coupled with the slider.

The transducer 100 includes a read sensor 110 and soft magnetic side shields 102 and 104. In general, the read transducer 100 will also include shields above and below the sensor 110. The sensor 110 includes a sensor layer 112. In some embodiments, the sensor 110 is a GMR or TMR sensor. Thus, the sensor layer 112 may be a free layer. The sensor 110 may also include a pinning layer such as an AFM layer, pinned layer, and a nonmagnetic spacer or barrier layer between the pinned and free layers. The sensor 110 may also include seed and/or capping layer(s). The nonmagnetic spacer/barrier layer may be above or below the sensor layer. However, there is no in-stack hard bias. Thus, there is no hard bias layer within the sensor 110 or directly above or directly below the sensor 110.

The sensor layer 112 has edges in the track width direction. The soft magnetic side shields 102 and 104 are a distance, d, from these edges of the sensor layer 12. Thus, the soft magnetic side shields 102 and 104 are adjacent to the sides of the sensor 110. The soft magnetic side shields 102 and 104 are made using soft magnetic material(s). Thus, the soft magnetic side shields 104 and/or 102 include magnetic material(s) that may have a full film permeability of at least ten. In other embodiments, the full film permeability of the magnetic material(s) used for the soft magnetic side shields 102 and 104 is at least twenty-five. In some embodiments, the magnetic material(s) used for the soft magnetic side shields 102 and 104 have a full film permeability of at least one hundred. For example, the soft magnetic side shields 102 and/or 104 may include NiFe, such as Permalloy. Because the soft magnetic side shields 102 and 104 have a high permeability, the soft magnetic side shields 102 and 104 may shield the sensor layer 112 from stray fields entering through the edges.

In addition, the soft magnetic side shield 102 and/or 104 magnetically biases the sensor layer 112. As can be seen in FIG. 2, the magnetization 111 of the sensor layer 112 results in positive magnetic charges (+) on one side of the sensor layer 111 and negative magnetic charges (−) on the opposite side of the sensor layer 112. Because the soft magnetic side shields 102 and 104 have a high permeability, negative magnetic charges (−) are formed on the side of the soft magnetic side shield 102 closest to the positive magnetic charges in the sensor layer 112. Similarly, positive magnetic charges (+) are formed on the side of the soft magnetic side shield 104 closest to the negative magnetic charges in the sensor layer 112. Thus, the soft magnetic side shields 102 and 104 may mirror the magnetic charges of the sensor layer 112. If the magnetization 111 of the sensor layer 112 is in the opposite direction to that shown in FIG. 2, the soft magnetic side shields 102 and 104 would be oppositely charged to mirror this magnetization. This mirroring may be more effective when the distance between the side shield 102/104 and the sensor layer 112, d, is less than the thickness, t, of the sensor layer 112. The presence of the mirrored magnetic charges on the soft magnetic side shields 102 and 104 aids in stabilizing the magnetization 111 of the sensor layer 112. As a result, the soft magnetic side shields 102 and 104 may magnetically bias the sensor layer 112 in addition to acting as shields.

Further, the magnetic side shields 102 and 104 have lengths, l, in the track width direction and depth, SH in the stripe height direction (perpendicular to the ABS). The length divided by the stripe height is at least ten. In some embodiments, the length divided by the stripe height is at least twenty-five. For example, in some embodiments, the length may be one micron and the stripe height may be fifty nanometers. Because of the high aspect ratio, the ability of the soft magnetic side shields 102 and 104 to magnetically bias, or stabilize, the sensor layer 112 may be further improved. In particular, the high aspect ratio indicates that the soft magnetic side shields 102 and 104 have a shape anisotropy. Because of this shape anisotropy, the soft magnetic side shields 102 and/or 104 may have magnetic charges at their edges in the track width direction. These magnetic charges may further contribute to the biasing of the sensor layer 112. Thus, the soft magnetic side shields 102 and 104 may be used to magnetically stabilize the sensor layer 112 in addition to providing side shielding from extraneous magnetic fields.

Although not depicted, the read transducer 100 may include shields on either side of the sensor 110 in the down track direction. In some embodiments, the soft magnetic side shields 102 and/or 104 are connected with one or both of these shields. The soft magnetic side shields 102 and 104 are also depicted as extending both above and below the sensor layer 112. In other embodiments, extend only to an opposite edge of the sensor layer 112. For example, if the soft magnetic side shields 102 and/or 104 are connected to a shield below the sensor layer 112, then the soft magnetic side shields 102 and/or 104 extend from the bottom shield to the top of the sensor layer 112. Conversely, if the soft magnetic side shields 102 and/or 104 are connected to a shield above the sensor layer 112, then the soft magnetic side shields 102 and/or 104 extend from the bottom shield to the bottom of the sensor layer 112.

In some embodiments, the soft magnetic side shields 102 and/or 104 are composed of a single high full film permeability material. For example, Permalloy may be used to form the soft magnetic side shields 102 and/or 104. In other embodiments, the soft magnetic side shields 102 and/or 104 include multiple materials, which may not all have a high permeability. For example, the magnetic side shields 102 and/or 105 may be a multilayer. For example, the multilayer may include a first magnetic layer, a second magnetic layer, and a non-magnetic layer between the first magnetic layer and the second magnetic layer. In some embodiments, the first and second magnetic layers may be antiferromagnetically aligned. In other embodiments, the first and second magnetic layer may be ferromagnetically aligned. In other embodiments, all of the layers in the multilayer may be ferromagnetic.

In the embodiment shown, the soft magnetic side shields 102 and/or 104 have a stripe height SH. Further, the stripe height of the side shields 102 and/or 104 is substantially the same as that of the sensor layer 112. However, in other embodiments, the sensor layer 112 may have a different stripe height than the sensor layer 112. For example the soft magnetic shield 102 and/or 104 may extend further than or not as far as the sensor layer 112 in the stripe height direction. In addition, the thickness of the soft magnetic side shield 102 and/or 104 may change in the stripe height direction and/or the track width direction.

Thus, the soft magnetic shields 102 and/or 104 may shield the sensor layer 112 from stray magnetic fields that would otherwise enter the sides of the sensor layer 112. Consequently, the cross-track resolution of the transducer 100 may be improved. Stated differently, the magnetic track width for a particular physical width of the sensor layer 112 may be reduced. Further, the ability to utilize methods such as shingle recording using the transducer 100 may be improved. The transducer 100 also need not have an in-stack bias layer. Instead, the soft magnetic shields 102 and/or 104 may magnetically bias the sensor layer 112. Thus, the improvements in resolution may be achieved while maintaining a lower shield-to-shield spacing. Instead of providing a hard bias layer, the soft magnetic side shields 102 and/or 104 may mirror the charges formed at the edges of the sensor layer 112. This mirroring can magnetically bias the sensor layer 112 such that its equilibrium magnetization is in-plane and parallel or anti-parallel to the magnetization 111 shown. Further, the shape anisotropy of the soft magnetic side shields 102 and/or 104 may result in magnetic charges at the edges of the soft magnetic side shields 102 and/or 104 in the track width direction. These magnetic charges may further contribute to the biasing of the sensor layer 112. Thus, the improvements in resolution and shield-to-shield spacing may be achieved while maintaining a suitable magnetic bias of the sensor layer 112.

Figure 3:
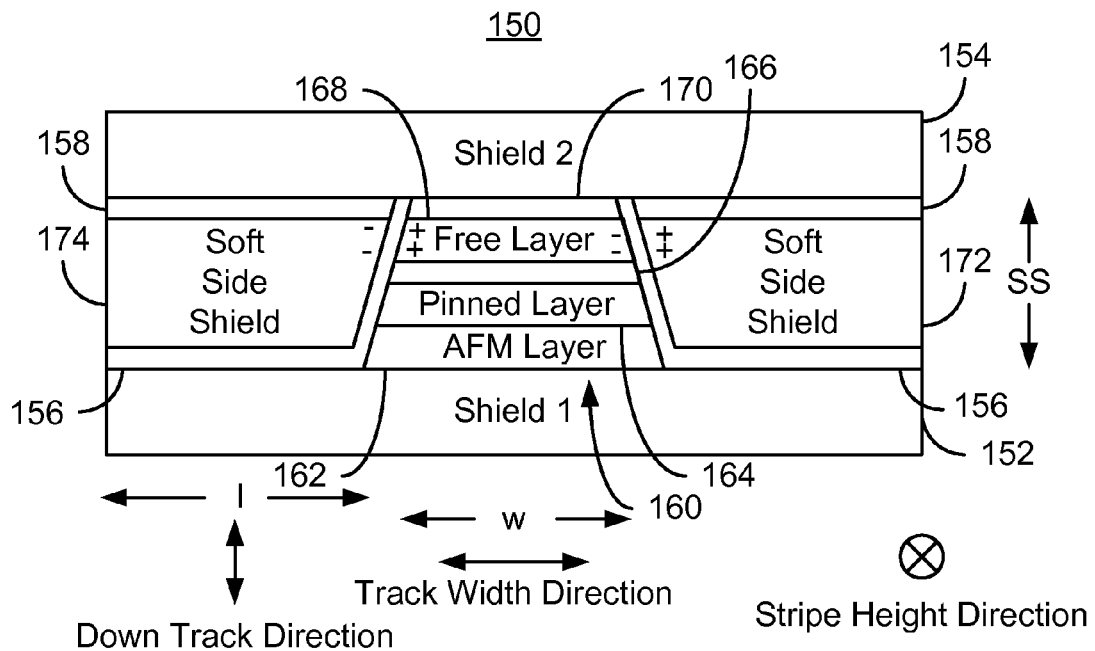
FIG. 3 is an ABS view of an exemplary embodiment of a portion of a magnetic recording read transducer.

FIG. 3 depicts an ABS view of an exemplary embodiment of a portion of a magnetic read transducer 150. For clarity, FIG. 3 is not to scale. The read transducer 150 may be part of a read head or may be part of a merged head that also includes a write transducer. The head of which the read transducer 150 is a part is part of a disk drive having a media, a slider and the head coupled with the slider. The magnetic read transducer 150 may be viewed as an application of the magnetic transducer 100. The magnetic transducer 150 includes a sensor 160 corresponding to the sensor 110 and soft magnetic side shields 172 and 174 corresponding to soft magnetic side shields 102 and 104, respectively. The magnetic transducer 150 also includes shield 1 152, shield 2 154, insulator 156 and nonmagnetic layer 158. The sensor 160 is a CPP sensor including an AFM pinning layer 162, a pinned layer 164, a nonmagnetic spacer layer 166, a free layer 168, and a capping layer 170. The free layer 168 corresponds to sensor layer 112 and will be termed a sensor layer 168 herein. The nonmagnetic spacer layer 166 may be a tunneling barrier layer, a conductive layer, or other analogous layer. The arrangement and components used in the sensor 160 may vary in other embodiments. Further, one or more of the layers 162, 164, 166, 168, and 170 might be a multilayer. For example, the pinned layer 166 may be a synthetic antiferromagnet including two antiferromagnetically aligned magnetic layers separated by a conductive nonmagnetic layer. In other embodiments, the sensor layer 160 may be used in a CIP configuration or may be another type of sensor having a sensor layer analogous to the sensor layer 168. Although not shown, the sensor 160 may include a seed layer and/or may omit the capping layer 170. As can be seen in FIG. 3, there is no in-stack hard bias for the magnetic transducer 150. Thus, there is no hard bias layer within the sensor 160 or between the sensor 160 and the portion of the shields 154 and 152 directly above and directly below the sensor 160, respectively. In other words, there is no hard bias layer between the sensor layer 168 and shields 152 and 154 in the down track direction from the sensor layer 168.

The sensor layer 168 has a width, w, and edges in the track width direction. The soft magnetic side shields 172 and 174 are adjacent to the sides of the sensor 168. The soft magnetic side shields 172 and 174 include magnetic material(s) that may have a full film permeability of at least ten. In other embodiments, the full film permeability of the magnetic material(s) used for the soft magnetic side shields 172 and 174 has a full film permeability of at least twenty-five. In some embodiments, the full film permeability of the magnetic material(s) used for the soft magnetic side shields 172 and 174 has a full film permeability of at least one hundred. For example, the soft magnetic side shields 172 and/or 174 may include NiFe, such as Permalloy. Because the soft magnetic side shields 172 and 1074 have a high permeability, the sensor layer 168 may be shielded from stray magnetic fields entering through the sides.

The soft magnetic side shields 172 and 174 may also magnetically bias the sensor layer 168. The magnetization (not shown) of the sensor layer 168 results in positive magnetic charges (+) on one side of the sensor layer 168 and negative magnetic charges (−) on the opposite side of the sensor layer 112. The soft magnetic side shields 172 and 174 mirror these charges in the region of the sensor layer 168. This mirroring may be more effective when the distance between the side shield 102/104 and the sensor layer 168 is less than the thickness of the sensor layer 168 in the down track direction. Thus, the thickness of the insulating layer 156 is less than the thickness of the sensor layer 168. In general, the thickness of the insulating layer 156 is significantly less than that of the sensor layer 168. Because of the presence of the mirrored magnetic charges on the soft magnetic side shields 172 and 174 the sensor layer 168 is magnetically biased.

The magnetic side shields 172 and 174 have lengths, l, in the track width direction and a depth in the stripe height direction (perpendicular to the ABS). The length divided by the depth is at least ten and, in some embodiments, at least twenty-five. For example, in some embodiments, the length may be one micron and the stripe height may be fifty nanometers. Because of the high aspect ratio, the ability of the soft magnetic side shields 172 and 174 to magnetically bias, or stabilize, the soft magnetic side shields 172 and 174 have a shape anisotropy. This shape anisotropy allows magnetic charges to be generated at the edges of the soft magnetic side shields 172 and 174. In the embodiment shown, the edges of the sensor 160 and soft magnetic side shields 172 and 174 are sloped. This slope may modulate the magnetic charges generated at the edges of the soft magnetic side shields 172 and 174, resulting in the magnetic charges being distributed along the edges of the soft magnetic side shields 172 and 174. Thus, the soft magnetic side shields 172 and 174 may be used to magnetically stabilize the sensor layer 168 in addition to providing side shielding from extraneous magnetic fields.

In the embodiment shown, the soft magnetic side shields 172 and 174 are separated from the shield 2 154 by nonmagnetic layer 158. Thus, the side shields 172 and 174 are magnetically decoupled from the shield 2 154. Similarly the presence of the layer 156 magnetically decouples the side shields 172 and 174 from the shield 1 152. However, in other embodiments, described below, the side shields 172 and/or 174 may be magnetically coupled with the shield 2 154 and/or the shield 1 152.

The soft magnetic side shields 172 and 174 are also shown as extending from the top of the sensor layer 168 past the bottom of the sensor layer 168. In other words, the soft magnetic side shields 172 and 174 extend from the top of the sensor layer 168 past the opposing surface. However, in other embodiments, the soft magnetic side shields 172 and 174 need not extend so far. For example, the side shields 172 and/or 174 could terminate at the bottom of the sensor layer 168. Thus, in some embodiments, the side shields 172 and 174 extend from one surface (e.g. top or bottom) of the sensor layer 168 to the opposing surface (e.g. bottom or top) in the down track direction. In other embodiments, the soft magnetic side shields 172 and 174 may not extend to the bottom of the sensor layer 158, but may overlap a substantial portion of the sensor layer 168.

The soft magnetic shields 172 and/or 174 may share the benefits of the soft magnetic side shields 102 and 104. For example, the sensor layer 168 may be shielded from stray magnetic fields that would otherwise enter the sides of the sensor layer 168. Consequently, the cross-track resolution of the transducer 150 may be improved. Further, the ability to utilize methods such as shingle recording may be improved. Further, the transducer 150 need not have an in-stack bias layer. Instead, the soft magnetic shields 172 and 174 may magnetically bias the sensor layer 112. Thus, the improvements in resolution may be achieved while maintaining a lower shield-to-shield spacing and a suitable magnetic bias of the sensor layer 168.

Figure 4:
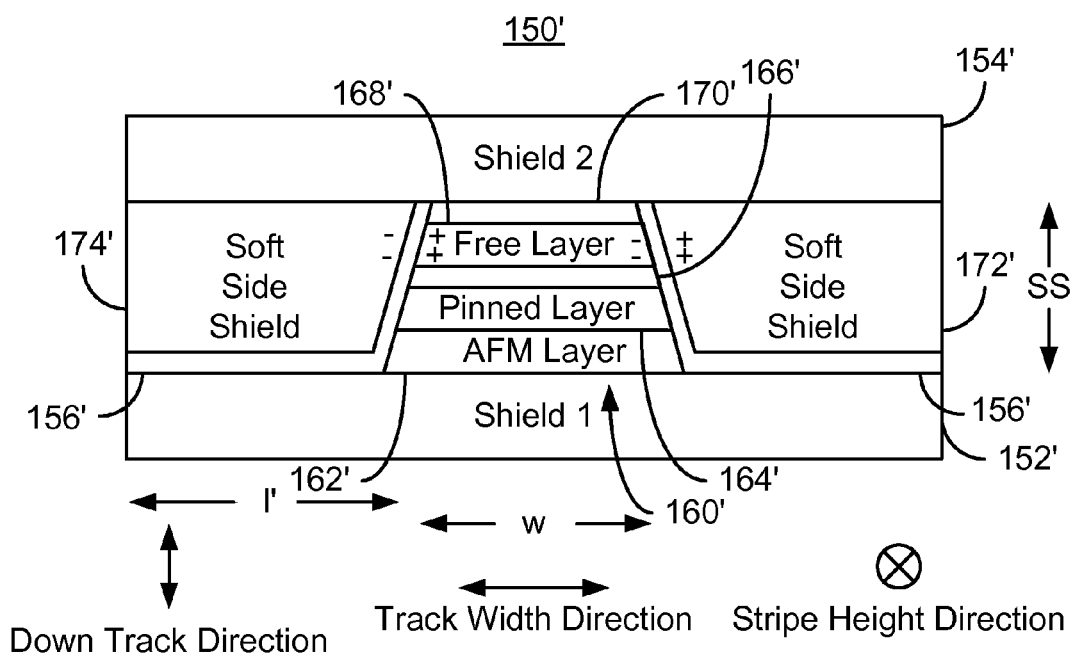
FIG. 4 is an ABS view of an exemplary embodiment of a portion of a magnetic recording read transducer.

FIG. 4 depicts an ABS view of an exemplary embodiment of a portion of a magnetic read transducer 150'. For clarity, FIG. 4 is not to scale. The read transducer 150' may be part of a read head or may be part of a merged head that also includes a write transducer. The head of which the read transducer 150' is a part is part of a disk drive having a media, a slider and the head coupled with the slider. The magnetic read transducer 150' may be viewed as an application of the magnetic transducer 100. Further, the magnetic read transducer 150' corresponds to the magnetic read transducer 150. Similar components have analogous labels. The magnetic transducer 150' includes shields 152' and 154', nonmagnetic insulating layer 156', sensor 160' having layers 162', 164', 166', 168', and 170', and soft magnetic side shields 172' and 174' that correspond to shields 152 and 154, nonmagnetic insulating layer 156, sensor 160 having layers 162, 164, 166, 168, and 170, and soft magnetic side shields 172' and 174', respectively. Thus, the components 152', 154', 156', 160', 162', 164', 166', 168', 170', 172', and 174' have a similar structure and function to the components, 152, 154, 156, 160, 162, 164, 166, 168, 170, 172, and 174, respectively.

In addition, the side shields 172' and 174' are magnetically (and structurally) coupled with one of the shields. More specifically, the side shields 172' and 174' are connected with shield 2 154'. In the embodiment shown, the side shields 172' and 174' physically contact the shield 2 154'. However, in other embodiments, a magnetic interlayer (not shown) may reside between the side shields 172' and 174' and the shield 2 154'. Consequently, the side shields 172' and 174' may be magnetically coupled with the shield 2 154', but not physically or, in some embodiments, electrically connected with the shield 2 154'. In other embodiments, the side shields 172' and/or 174' may be magnetically connected with the shield 2 154' and/or the shield 1 160.

The transducer 150' may share the benefits of the transducer 150 due to the soft magnetic shields 172' and/or 174'. For example, the sensor layer 168' may be shielded from stray magnetic fields that would otherwise enter the sides of the sensor layer 168'. Consequently, the cross-track resolution of the transducer 150' may be improved. Further, the ability to utilize methods such as shingle recording may be improved. The transducer 150' does not have an in-stack bias layer. Instead, the soft magnetic shields 172' and 174' may magnetically bias the sensor layer 112'. Thus, the improvements in resolution may be achieved while maintaining a lower shield-to-shield spacing and a suitable magnetic bias of the sensor layer 168.

Figure 5:
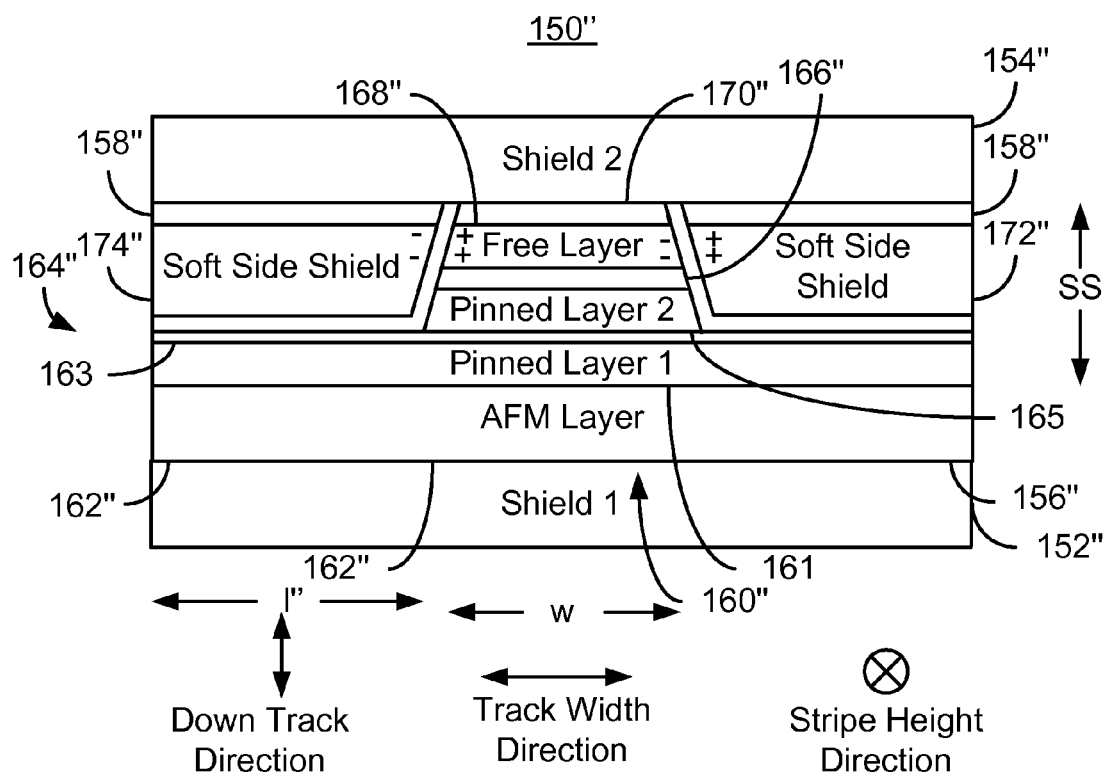
FIG. 5 is an ABS view of an exemplary embodiment of a portion of a magnetic recording read transducer.

FIG. 5 depicts an ABS view of an exemplary embodiment of a portion of a magnetic read transducer 150". For clarity, FIG. 5 is not to scale. The read transducer 150" may be part of a read head or may be part of a merged head that also includes a write transducer. The head of which the read transducer 150" is a part is part of a disk drive having a media, a slider and the head coupled with the slider. The magnetic read transducer 150" may be viewed as an application of the magnetic transducer 100. Further, the magnetic read transducer 150" corresponds to at least one of the magnetic read transducers 150 and 150'. Similar components have analogous labels. The magnetic transducer 150" includes shields 152" and 154", nonmagnetic insulating layer 156", nonmagnetic layer 158", sensor 160" having layers 162", 164", 166", 168", and 170", and soft magnetic side shields 172" and 174" that correspond to shields 152/152' and 154/154', nonmagnetic insulating layer 156', nonmagnetic layer 158, sensor 160/160' having layers 162/162', 164/164', 166/166', 168/168', and 170/170', and soft magnetic side shields 172'/172' and 174'/174', respectively. Thus, the components 152", 154", 156". 158". 160". 162", 164", 166", 168", 170", 172", and 174" have a similar structure and function to the components, 152/152', 154/154', 156/156', 158, 160/160', 162/162', 164/164', 166/166', 168/168', 170/170', 172/172', and 174/174', respectively.

The pinned layer 164' is a synthetic pinned layer having ferromagnetic layers pinned layer 1 161 and pinned layer 2 165 separated by nonmagnetic layer 163. In other embodiments, a single layer pinned layer 164' might be used In addition, pinned layer 1 161 and the AFM layer 156" are extended in the track width direction. Thus, in some embodiments, the soft magnetic side shields 172" and 174" do not extend to the bottom of the sensor 160". In other embodiments, the soft magnetic side shields 172" and 174" extend to the bottom of the sensor 160", but would have a step corresponding to the edges of the extended pinned layer 161 and AFM layer 156". However, in both embodiments, the soft magnetic side shields 172" and 174" overlap at least the sensor layer 168". Further, although shown as being separated from the shield 2 154" by the nonmagnetic layer 158", in other embodiments, the soft magnetic side shields 172" and 174" may be connected to the shield 2 154" and/or shield 1 152". The pinned layer 164" is shown as being extended in the track width direction. In other embodiments, the pinned layer 162 may be extended in the stripe height direction in addition to or in lieu of being extended in the track width direction.

The transducer 150" may share the benefits of the transducer 150 and/or 150' due to the use of the soft magnetic shields 172" and/or 174". For example, the cross-track resolution and ability to use shingle recording may be improved. The transducer 150" also does not have an in-stack bias layer, preserving the shield-to-shield spacing while maintaining a suitable magnetic bias of the sensor layer 168". Moreover, the pinned layer 164" and AFM layer 162" can be tailored separately from the side shields 172" and 174". Thus, performance of the transducer 150" may be further enhanced.

Figure 6:
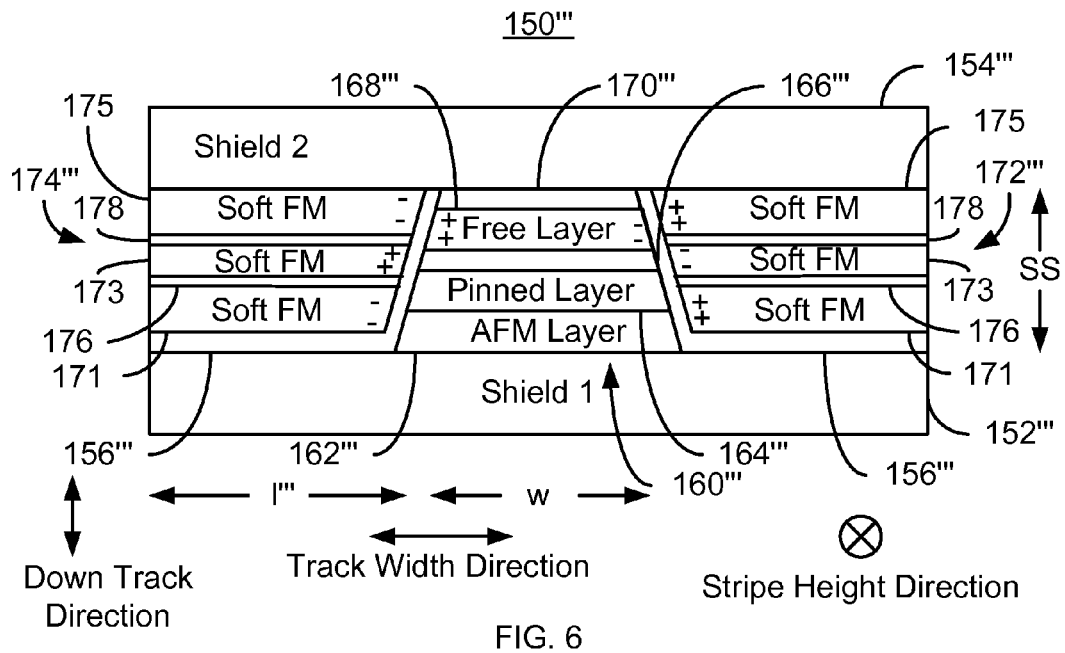
FIG. 6 is an ABS view of an exemplary embodiment of a portion of a magnetic recording read transducer.

FIG. 6 depicts an ABS view of an exemplary embodiment of a portion of a magnetic read transducer 150'''. For clarity, FIG. 6 is not to scale. The read transducer 150''' may be part of a read head or may be part of a merged head that also includes a write transducer. The head of which the read transducer 150''' is a part is part of a disk drive having a media, a slider and the head coupled with the slider. The magnetic read transducer 150''' may be viewed as an application of the magnetic transducer 100. Further, the magnetic read transducer 150''' corresponds to one or more of the magnetic read transducers 150, 150', and 150". Similar components have analogous labels. The magnetic transducer 150''' includes shields 152''' and 154''', nonmagnetic insulating layer 156''', nonmagnetic layer 158''', sensor 160''' having layers 162''', 164''', 166''', 168''', and 170''', and soft magnetic side shields 172''' and 174''' that correspond to shields 152/152'/152" and 154/154'/154", nonmagnetic insulating layer 156/156'/156", nonmagnetic layer 158/158", sensor 160/160'/160" having layers 162/162'/162", 164/164'/164", 166/166'/166", 168/168'/168", and 170/170'/170", and soft magnetic side shields 172'/172'/172" and 174'/174'/174", respectively. Thus, the components 152''', 154''', 156''', 158'''. 160''', 162''', 164''', 166''', 168''', 170''', 172''', and 174''' have a similar structure and function to the components, 152/152'/152", 154/154'/154", 156/156'/156", 158/158", 160/160'/160, 162/162'/162", 164/164'/164", 166/166'/166", 168/168'/168", 170/170'/170", 172/172'/172", and 174/174'/174", respectively.

In addition, the soft magnetic side shields 172''' and 174''' is each a multilayer. In the embodiment shown, each soft magnetic side shield 172''' and 174''' includes soft ferromagnetic layers 171, 173, and 175 separated by a nonmagnetic spacer layers 176 and 178. However, in other embodiments, other and/or additional layers might be used. The materials used for the soft ferromagnetic layers 171, 173, and 175 are high permeability materials, such as those described above with respect to the transducer 100. In the embodiment shown, the soft ferromagnetic layers 171, 173, and 175 are antiferromagnetically aligned. However, in other embodiments, other alignments between the soft magnetic layers 171, 173, and 175 may be used. Further, another number of ferromagnetic layers and/or nonmagnetic spacer layer may be used.

The transducer 150''' may share the benefits of the transducer 150, 150', and/or 150" due to the use of the soft magnetic shields 172''' and/or 174'''. For example, the cross-track resolution and ability to use shingle recording may be improved. The transducer 150''' also does not have an in-stack bias layer, preserving the shield-to-shield spacing while maintaining a suitable magnetic bias of the sensor layer 168'''. Moreover, the net magnetization of the soft magnetic shields 172''' and 174''' may be reduced by the antiferromagnetic coupling of the layers 174 and 178. In other embodiments using other multilayers other benefits might be achieved. Thus, performance of the transducer 150" may be further enhanced.

Figure 7:
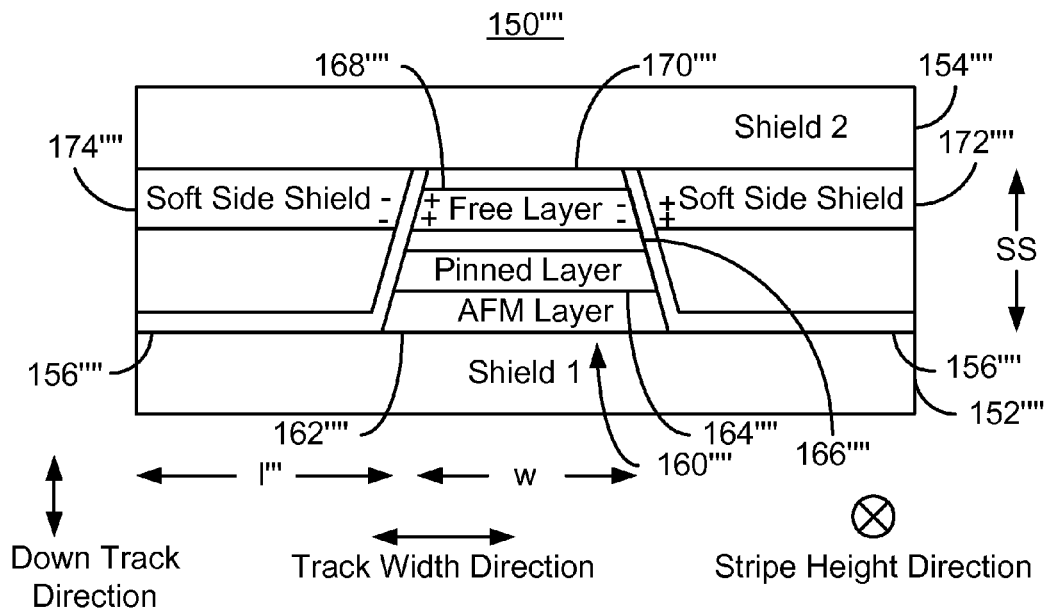
FIG. 7 is an ABS view of an exemplary embodiment of a portion of a magnetic recording read transducer.

FIG. 7 depicts an ABS view of an exemplary embodiment of a portion of a magnetic read transducer 150''''. For clarity, FIG. 7 is not to scale. The read transducer 150'''' may be part of a read head or may be part of a merged head that also includes a write transducer. The head of which the read transducer 150'''' is a part is part of a disk drive having a media, a slider and the head coupled with the slider. The magnetic read transducer 150'''' may be viewed as an application of the magnetic transducer 100. Further, the magnetic read transducer 150''' corresponds to the magnetic read transducers 150, 150', 150", and 150'''. Similar components have analogous labels. The magnetic transducer 150'''' includes shields 152'''' and 154'''', nonmagnetic insulating layer 156'''', nonmagnetic layer 158'''', sensor 160'''' having layers 162'''', 164'''', 166'''', 168'''', and 170'''', and soft magnetic side shields 172'''' and 174'''' that correspond to shields 152/152'/152"/152''' and 154/154'/154''', nonmagnetic insulating layer 156/156'/156"/156''', nonmagnetic layer 158/158"/158''', sensor 160/160'/160"/160''' having layers 162/162'/162"/162''', 164/164'/164"/164''', 166/166'/166"/166''', 168/168'/168"/168''', and 170/170'/170"/170''', and soft magnetic side shields 172'/172'/172"/172''' and 174'/174'/174"/174''', respectively. Thus, the components 152'''', 154'''', 156'''', 158'''', 160'''', 162'''', 164'''', 166'''', 168'''', 170'''', 172'''', and 174'''' have a similar structure and function to the components, 152/152'/152"/152''', 154/154'/154"/154''', 156/156'/156"/156''', 158/158"/158''', 160/160'/160"/160''', 162/162'/162"/162''', 164/164'/164"/164''', 166/166'/166"/166''', 168/168'/168"/168''', 170/170'/170"/170''', 172'/172'/172"/172''', and 174'/174'/174"/174''', respectively.

In addition, the soft magnetic side shields 172'''' and 174'''' do not extend past the edge of the sensor layer 168'''' opposite to the shield 154''' to which the soft magnetic shields 172'''' and 174'''' are coupled. Thus, the soft magnetic side shields 172'''' and 174'''' substantially completely overlap the sensor layer 168'''' in the down track direction. However the soft magnetic side shields 172'''' and 174'''' do not extend past the sensor layer 168'''' in the down track direction.

The transducer 150'''' may share the benefits of the transducer 150, 150', 150" and/or 150''' due to the use of the soft magnetic shields 172'''' and/or 174''''. For example, the cross-track resolution and ability to use shingle recording may be improved. These benefits may be achieved even though the soft side shields 172'''' and 174'''' do not fill the space between the shields 152'''' and 154'''' next to the sensor 160''''. The transducer 150'''' also does not have an in-stack bias layer, preserving the shield-to-shield spacing while maintaining a suitable magnetic bias of the sensor layer 168''''. Thus, performance of the transducer 150'''' may be enhanced.

Figure 8:
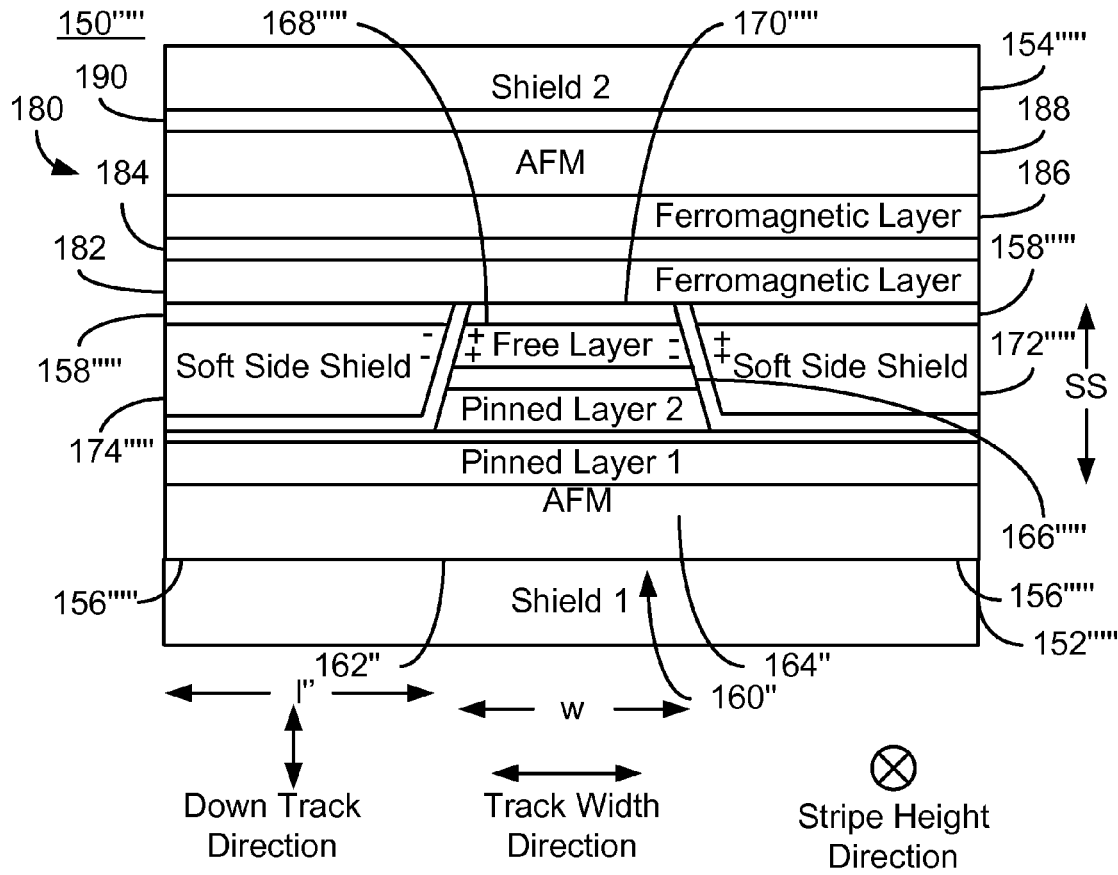
FIG. 8 is an ABS view of an exemplary embodiment of a portion of a magnetic recording read transducer.

FIG. 8 depicts an ABS view of an exemplary embodiment of a portion of a magnetic read transducer 150'''''. For clarity, FIG. 8 is not to scale. The read transducer 150''''' may be part of a read head or may be part of a merged head that also includes a write transducer. The head of which the read transducer 150''''' is a part is part of a disk drive having a media, a slider and the head coupled with the slider. The magnetic read transducer 150''''' may be viewed as an application of the magnetic transducer 100. Further, the magnetic read transducer 150''''' corresponds to the magnetic read transducers 150, 150', 150", 150''', and 150''''. Similar components have analogous labels. The magnetic transducer 150''''' includes shields 152''''' and 154''''', nonmagnetic insulating layer 156''''', nonmagnetic layer 158''''', sensor 160''''' having layers 162''''', 164''''', 166''''', 168''''', and 170''''', and soft magnetic side shields 172''''' and 174''''' that correspond to shields 152/152'/152"/152'''/152'''' and 154/154'/154"/154'''/154'''', nonmagnetic insulating layer 156/156'/156"/156'''/156'''', nonmagnetic layer 158/158"/158'''/158'''', sensor 160/160'/160"/160'''/160'''' having layers 162/162'/162"/162'''/162'''', 164/164'/164"/164'''/164'''', 166/166'/166"/166'''/166'''', 168/168'/168"/168'''/168'''', and 170/170'/170"/170'''/170'''', and soft magnetic side shields 172'/172'/172"/172'''/172'''' and 174'/174'/174"/174'''/174'''', respectively. Thus, the components 152''''', 154''''', 156''''', 158''''', 160''''', 162''''', 164''''', 166''''', 168''''', 170''''', 172''''', and 174''''' have a similar structure and function to the analogous components in the transducers 150, 150', 150", 150''', and 150''''.

In addition, a multilayer 180 is used for the shield 2 154'''''. The shield 2 154''''' may be plated on the multilayer 180. In other embodiments, the shield 2 154''''' may be sputtered on the multilayer 180. The multilayer 180 includes layers 182, 184, 186, and 188. Thus, antiferromagnetically coupled ferromagnetic layers 182 and 186 are separated by nonmagnetic layer 184. AFM layer 188 is also provided as part of multilayer 180. Also shown is an optional nonmagnetic interlayer 190. Although the multilayer 180 may be used, the soft magnetic side shields 172''''' and 174''''' are not substantially adversely affected. Thus, the transducer 150''''' may share the benefits of the transducer 150, 150', 150", 150''', and/or 150'''' due to the use of the soft magnetic shields 172''''' and/or 174'''''. The transducer 150''''' also does not have an in-stack bias layer, preserving the shield-to-shield spacing while maintaining a suitable magnetic bias of the sensor layer 168'''''. Further, the benefits of the multilayer 180 may be attained. Thus, performance of the transducer 150''''' may be enhanced.

Figure 9:
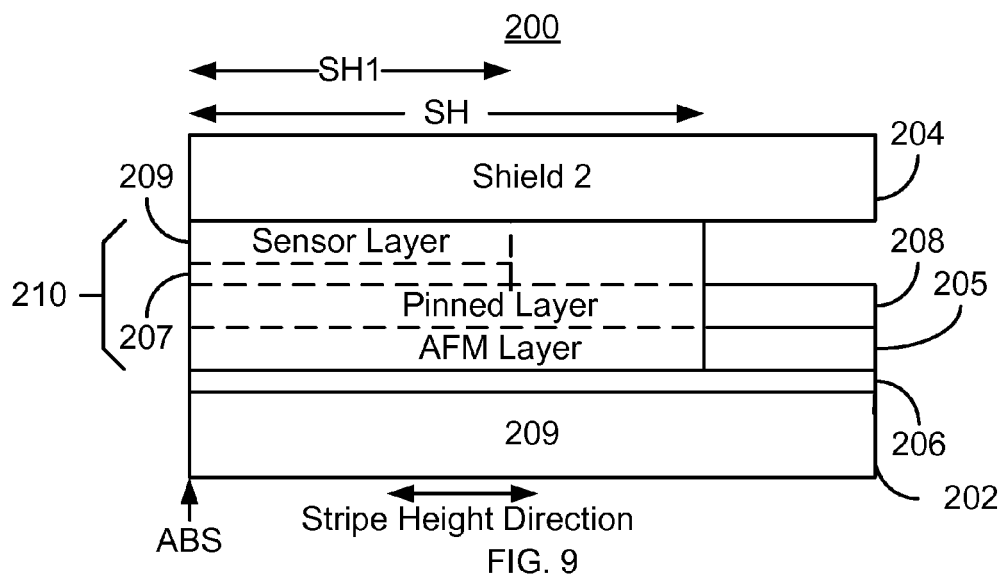
FIG. 9 is a side view of an exemplary embodiment of a portion of a magnetic recording read transducer.

FIG. 9 depicts a side view of an exemplary embodiment of a portion of a magnetic read transducer 200. For clarity, FIG. 9 is not to scale. The read transducer 200 may be part of a read head or may be part of a merged head that also includes a write transducer. The head of which the read transducer 200 is a part is part of a disk drive having a media, a slider and the head coupled with the slider. The magnetic read transducer 200 may be viewed as an application of the magnetic transducer 100. Further, the magnetic read transducer 200 corresponds to the magnetic read transducers 150, 150', 150", 150''', 150'''', and 150'''''.

The transducer 200 includes shield 1 202, nonmagnetic layer 206, shield 2 204, and side shield 210. Also shown are a sensor layer 209, a nonmagnetic spacer layer 207, a pinned layer 208 and an AFM layer 205 of a sensor having a stripe height SH1. Where the sensor layer 209, nonmagnetic layer 207, pinned layer 208, and AFM layer 205 overlap the soft magnetic side shield 210, these layers 205, 207, 208, and 209 are shown as dashed lines. The pinned layer 208 extends beyond the stripe height SH1 of the sensor layer 209 and nonmagnetic layer 207. The soft magnetic side shield 210 has a stripe height SH that is greater than the stripe height SH1 of the sensor, but less than the length of the pinned layer 208 in the stripe height direction. In other embodiments, the soft magnetic side shield 210 may extend a different distance in the stripe height direction. Other components analogous to those shown in FIGS. 2-8 may be present but are not shown for simplicity. This configuration is known as an extended pinned layer. It is similar to the transducers 150″ and 150‴ in that at least part of the pinned layer 208 extends significantly beyond the sensor layer 209. However, the pinned layer 208 does so in the stripe height direction.

The transducer 200 may share the benefits of the transducer 150, 150′, 150″, 150‴, 150⁗, and/or 150‴″ due to the use of the soft magnetic shields 210. The transducer 200 also does not have an in-stack bias layer, preserving the shield-to-shield spacing while maintaining a suitable magnetic bias of the sensor layer (not shown). Further, the benefits of extended pinned layer 208 may be attained. Thus, performance of the transducer 200 may be enhanced.

Figure 10:
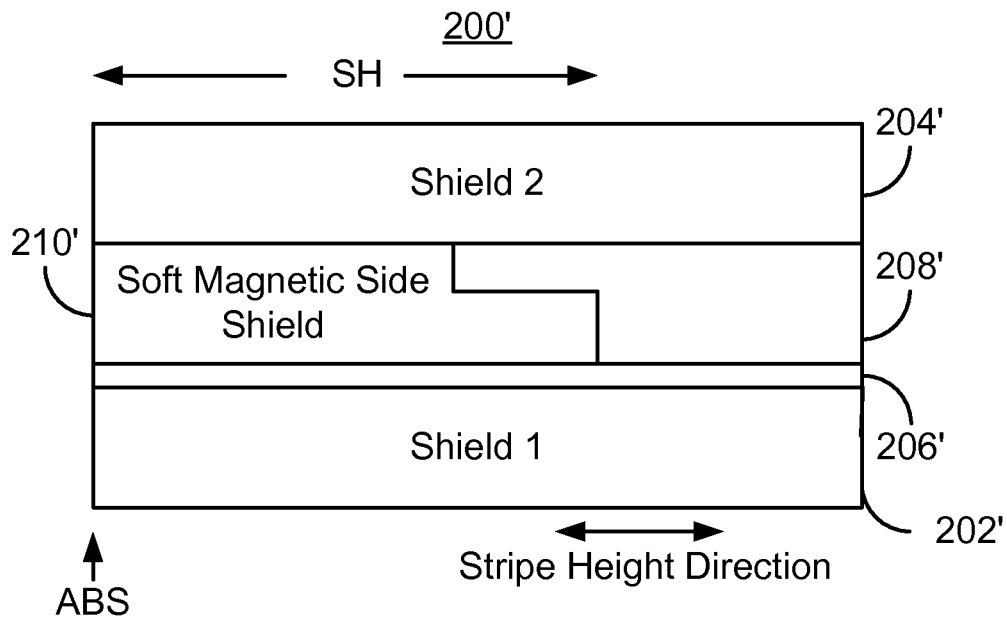
FIG. 10 is a side view of an exemplary embodiment of a portion of a magnetic recording read transducer.

FIG. 10 depicts a side view of an exemplary embodiment of a portion of a magnetic read transducer 200′. For clarity, FIG. 10 is not to scale. The read transducer 200′ may be part of a read head or may be part of a merged head that also includes a write transducer. The head of which the read transducer 200′ is a part is part of a disk drive having a media, a slider and the head coupled with the slider. The magnetic read transducer 200′ may be viewed as an application of the magnetic transducer 100. Further, the magnetic read transducer 200′ corresponds to the magnetic read transducers 150, 150′, 150″, 150‴, 150⁗, 150‴″, and 200.

In the transducer 200, the soft magnetic side shield 210′ has a stripe height SH. Thus, the soft magnetic side shield 210 does not extend as far into the transducer 200′ in the stripe height direction as do the shields 202′ and 204′. Further, the thickness of the soft magnetic side shield 210′ varies in the stripe direction. Other components analogous to those shown in FIGS. 2-8 may be present but are not shown for simplicity.

The transducer 200 may share the benefits of the transducer 150, 150′, 150″, 150‴, 150⁗, and/or 150‴″ due to the use of the soft magnetic shields 210′. The transducer 200′ also does not have an in-stack bias layer, preserving the shield-to-shield spacing while maintaining a suitable magnetic bias of the sensor layer (not shown). Note that various features are highlighted in the transducers 100, 150, 150′, 150″, 150‴, 150⁗, 150‴″, 200, and 200′. Various features of the transducers 100, 150, 150′, 150″, 150‴, 150⁗, 150‴″, 200, and/or 200′ may be combined in other embodiments. Consequently, the benefits of one or more of the transducers 100, 150, 150′, 150″, 150‴, 150⁗, 150‴″, 200, and 200′ may be achieved in various embodiments.

Figure 11:
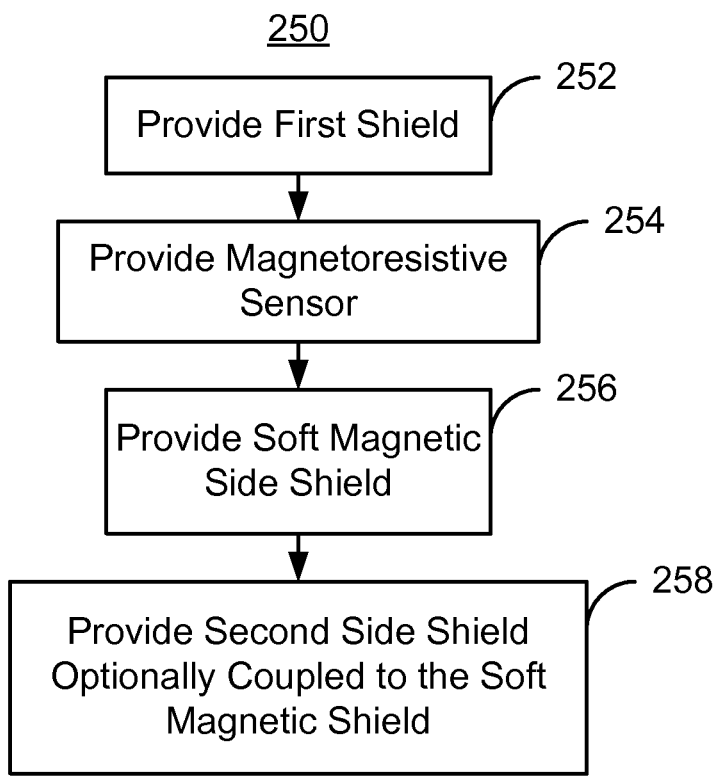
FIG. 11 is flow chart depicting an exemplary embodiment of a method for fabricating a portion of a magnetic recording read transducer.

FIG. 11 is an exemplary embodiment of a method 250 for providing a read transducer utilizing a soft magnetic side shield. For simplicity, some steps may be omitted, interleaved, and/or combined. The method 250 is also described in the context of providing a single recording transducer 150. However, the method 250 may be used to fabricate multiple transducers at substantially the same time. The method 250 may also be used to fabricate other transducers including but not limited to any combination of 150, 150′, 150″, 150‴, 150⁗, 150‴″, 200, and/or 200′. The method 250 is also described in the context of particular layers. A particular layer may include multiple materials and/or multiple sub-layers. The method 250 also may start after formation of other portions of the magnetic recording transducer.

The shield 1 152 is provided, via step 252. Step 252 typically includes depositing a large high permeability layer. The shield 1 152 typically extends significantly further in the track width direction than the read sensor 168 or the side shields 172 and/or 174. The sensor 160 is provided, via step 254. Step 254 typically includes depositing the layers for the sensor, then defining the sensor in at least the track width direction using an ion mill. In some embodiments, the sensor is also defined in the stripe height direction. In some embodiments, the layers for the sensor are not completely milled through to provide an extended pinned layer. The soft magnetic side shields 172 and 174 are provided, via step 256. Step 256 may include depositing the high permeability and any other material(s) for the soft magnetic side shields 172 and 174 and defining the shields 172 and 174 in the track width and stripe height direction. The shield S2 may then be provided, via step 258. The shield 2 154 is optionally coupled to the side shields 172 and/or 174. If they are not coupled, then the nonmagnetic layer 158 is also provided. Formation of the transducer 150 may then be completed.

Using the method 250, the transducers 100, 150, 150′, 150″, 150‴, 150⁗, 150‴″, 200, and/or 200′ may be fabricated. Thus, the benefits of one or more of the transducers 100, 150, 150′, 150″, 150‴, 150⁗, 150‴″, 200, and 200′ may be achieved.

We claim:

1. A magnetic read transducer having an air-bearing surface (ABS) and comprising:
a first shield;
a magnetoresistive sensor including a sensor layer, the sensor layer having at least one edge in the track width direction along the ABS;
at least one soft magnetic side shield adjacent to the at least one edge, the at least one soft magnetic side shield having a full film permeability of at least ten;
a second shield, the magnetoresistive sensor residing between the first shield and the second shield such that the first shield and the second shield reside in a direction substantially perpendicular to the track width direction from the magnetoresistive sensor, the magnetoresistive sensor being free of an in-stack hard bias layer; and
wherein the at least one soft magnetic side shield is magnetically coupled and physically connected with at least one of the first shield and the second shield.

2. The magnetic read transducer of claim 1 wherein the at least one soft magnetic side shield further magnetically biases the sensor layer.

3. The magnetic read transducer of claim 1 wherein the at least one soft magnetic side shield has a length in the track width direction and a depth in a stripe height direction perpendicular to the ABS, the length divided by the depth being an aspect ratio of at least one.

4. The magnetic read transducer of claim 3 wherein the at least one soft magnetic side shield extends from the at least one of the first side shield and the second shield to at least an opposing surface of the free layer in a down track direction perpendicular to the stripe height direction and to the track width direction.

5. The magnetic read transducer of claim 1 wherein the at least one soft magnetic side shield has a length in the track width direction and a depth in a stripe height direction perpendicular to the ABS, the length divided by the depth being an aspect ratio of at least ten.

6. The magnetic read transducer of claim 5 wherein the free layer has a top surface and a bottom surface in a down track direction perpendicular to the stipe height direction and to the track width direction, the at least one soft magnetic side shield extending from at least the bottom of the free layer to at least the top of the free layer in the down track direction.

7. The magnetic read transducer of claim 5 wherein the at least one soft magnetic side shield has a first portion and a second portion, the first portion residing between the second portion and the ABS, the first portion having length in the track width direction and a depth in a stripe height direction perpendicular to the ABS, the length divided by the depth being an aspect ratio of at least ten.

8. The magnetic read transducer of claim 7 wherein the free layer has a top surface and a bottom surface in a down track direction perpendicular to the stipe height direction and to the track width direction, the at least one soft magnetic side shield extending from at least the bottom of the free layer to at least the top of the free layer in the down track direction.

9. The magnetic read transducer of claim 5 wherein the aspect ratio is at least twenty-five.

10. The magnetic read transducer of claim 1 wherein the length is at least one micron and the depth is not more than fifty nanometers.

11. The magnetic read transducer of claim 1 wherein the full film permeability is at least one hundred.

12. The magnetic read transducer of claim 1 wherein the at least one soft magnetic side shield is composed of a single high full film permeability material.

13. A magnetic read transducer having an air-bearing surface (ABS) and comprising:
a first shield;
a magnetoresistive sensor including a sensor layer, the sensor layer having at least one edge in the track width direction along the ABS;
at least one soft magnetic side shield adjacent to the at least one edge, the at least one soft magnetic side shield having a full film permeability of at least ten; and
a second shield, the magnetoresistive sensor residing between the first shield and the second shield, the magnetoresistive sensor being free of an in-stack hard bias layer;
wherein the at least one soft magnetic side shield is in magnetically coupled with at least one of the first shield and the second shield and wherein the at least one soft magnetic side shield has a first portion and a second portion, the first portion residing between the second portion and the ABS, the first portion having length in the track width direction and a depth in a stripe height direction perpendicular to the ABS, the length divided by the depth being an aspect ratio of at least one.

14. The magnetic read transducer of claim 13 wherein the at least one soft magnetic side shield extends from the at least one of the first side shield and the second shield to at least an opposing surface of the free layer in a down track direction perpendicular to the stripe height direction and to the track width direction.

15. A magnetic read transducer having an air-bearing surface (ABS) and comprising:
a first shield;
a magnetoresistive sensor including a sensor layer, the sensor layer having at least one edge in the track width direction along the ABS;
at least one soft magnetic side shield adjacent to the at least one edge, the at least one soft magnetic side shield having a full film permeability of at least ten; and
a second shield, the magnetoresistive sensor residing between the first shield and the second shield, the magnetoresistive sensor being free of an in-stack hard bias layer;
wherein the at least one soft magnetic side shield includes a plurality of layers.

16. The magnetic read transducer of claim 15 wherein the plurality of layers includes a first magnetic layer, a second magnetic layer, and a nonmagnetic layer between the first magnetic layer and the second magnetic layer.

17. The magnetic read transducer of claim 15 wherein the plurality of layers includes a plurality of ferromagnetic layers.

18. A magnetic read transducer having an air-bearing surface (ABS) and comprising:
a first shield;
a magnetoresistive sensor including a sensor layer, the sensor layer having at least one edge in the track width direction along the ABS;
at least one soft magnetic side shield adjacent to the at least one edge, the at least one soft magnetic side shield having a full film permeability of at least ten; and
a second shield, the magnetoresistive sensor residing between the first shield and the second shield, the magnetoresistive sensor being free of an in-stack hard bias layer
wherein the sensor layer has a sensor layer depth in a stripe height direction perpendicular to the ABS and wherein the sensor includes a pinned layer having a pinned layer depth greater than the sensor depth layer in the stripe height direction.

19. A method for providing a magnetic read transducer having an air-bearing surface (ABS) comprising:
providing a first shield;
providing a magnetoresistive sensor including a sensor layer, the sensor layer having at least one edge in the track width direction along the ABS;
providing at least one soft magnetic side shield adjacent to the at least one edge, the at least one soft magnetic side shield having a full film permeability of at least ten; and
providing a second shield, the magnetoresistive sensor residing between the first shield and the second shield such that the first shield and the second shield reside in a direction substantially perpendicular to the track width direction from the magnetoresistive sensor, the magnetoresistive sensor being free of an in-stack hard bias layer, the at least one soft magnetic side shield being magnetically coupled and physically connected with at least one of the first shield and the second shield.

20. The method of claim 19 wherein the at least one soft magnetic side shield has a length in the track width direction and a depth in a stripe height direction perpendicular to the ABS, the length divided by the depth being an aspect ratio of at least one.

21. The method of claim 20 wherein the at least one soft magnetic side shield extends from the at least one of the first side shield and the second shield to at least an opposing surface of the free layer in a down track direction perpendicular to the stripe height direction and to the track width direction.

22. The method of claim 20 wherein the at least one soft magnetic side shield has a first portion and a second portion, the first portion residing between the second portion and the ABS, the first portion having length in the track width direction and a depth in a stripe height direction perpendicular to the ABS, the length divided by the depth being an aspect ratio of at least one.

23. The method of claim 22 wherein the at least one soft magnetic side shield extends from the at least one of the first side shield and the second shield to at least an opposing surface of the free layer in a down track direction perpendicular to the stripe height direction and to the track width direction.

24. The method of claim 19 wherein the at least one soft magnetic side shield has a length in the track width direction and a depth in a stripe height direction perpendicular to the ABS, the length divided by the depth being an aspect ratio of at least ten.

25. The method of claim 24 wherein the free layer has a top surface and a bottom surface in a down track direction perpendicular to the stipe height direction and to the track width direction, the at least one soft magnetic side shield extending from at least the bottom of the free layer to at least the top of the free layer in the down track direction.

26. The method of claim 25 wherein the at least one soft magnetic side shield has a first portion and a second portion, the first portion residing between the second portion and the ABS, the first portion having length in the track width direction and a depth in a stripe height direction perpendicular to the ABS, the length divided by the depth being an aspect ratio of at least ten.

27. The method of claim 24 wherein the free layer has a top surface and a bottom surface in a down track direction perpendicular to the stipe height direction and to the track width direction, the at least one soft magnetic side shield extending from at least the bottom of the free layer to at least the top of the free layer in the down track direction.

28. The method of claim 19 wherein the length is at least one micron and the depth is not more than fifty nanometers.

29. The method of claim 19 wherein the full film permeability is at least one hundred.

30. The method of claim 19 wherein the at least one soft magnetic side shield is composed of a single high full film permeability material.

31. A method for providing a magnetic read transducer having an air-bearing surface (ABS) comprising:
providing a first shield;
providing a magnetoresistive sensor including a sensor layer, the sensor layer having at least one edge in the track width direction along the ABS;
providing at least one soft magnetic side shield adjacent to the at least one edge, the at least one soft magnetic side shield having a full film permeability of at least ten; and
providing a second shield, the magnetoresistive sensor residing between the first shield and the second shield, the magnetoresistive sensor being free of an in-stack hard bias layer;
wherein the at least one soft magnetic side shield includes a plurality of layers.

* * * * *